United States Patent [19]

Cazaux

[11] Patent Number: 5,114,237
[45] Date of Patent: May 19, 1992

[54] PROGRAMMABLE INTEGRATION TIME PHOTOSENSITIVE SENSOR

[75] Inventor: Yvon Cazaux, Grenoble, France

[73] Assignee: Thomson Composants Militaires et Spatiaux, Courbevoie, France

[21] Appl. No.: 602,671

[22] Filed: Oct. 24, 1990

[30] Foreign Application Priority Data

Oct. 24, 1989 [FR] France ............... 89 13907

[51] Int. Cl.⁵ ................. H04N 5/15; H04N 5/217
[52] U.S. Cl. .................. 358/213.23; 358/213.19; 358/213.31; 357/24
[58] Field of Search ........ 358/213.23, 213.19, 358/213.31, 213.29, 213.15; 357/241 R

[56] References Cited

U.S. PATENT DOCUMENTS

| 4,280,141 | 7/1981 | McCann et al. ............ 358/213 |
| 4,581,539 | 4/1986 | Kimata ....................... 358/213.23 |
| 4,645,938 | 2/1987 | Brissot et al. .............. 358/213.19 |
| 4,668,990 | 5/1987 | Kondo et al. ............... 358/213.23 |
| 4,744,057 | 5/1988 | Descure et al. ............ 358/213.19 |
| 4,775,798 | 10/1988 | Munier ....................... 358/213.23 |
| 4,900,943 | 2/1990 | Marshall et al. ............ 358/213.73 |

FOREIGN PATENT DOCUMENTS 0281178 7/1988 European Pat. Off.
2417899 2/1978 France.

*Primary Examiner*—James J. Groody
*Assistant Examiner*—Glenton B. Burgess
*Attorney, Agent, or Firm*—Oblon, Spivak, McClelland, Maier & Neustadt

[57] ABSTRACT

A photosensitive sensor including multilinear arrays of n lines of cells which operate by charge integration and time delay by successive observations of the same image line by the n lines in the array, and by accumulation of the corresponding n observations in the cells of the sensor.

To avoid the risk of saturation inherent in the fact that the electrical charges resulting from n observations accumulate in the same cell, the number of lines between which the charge integration and delays are preformed is programmed to be between 1 and n. This programming is performed as a function of the average illumination of the image analysed. To do so, the electrodes (ES1, ES2) of certain lines of cells are used, and potentials are applied to them; either the normal charge transfer potentials or a blocking potential which isolates the lines beyond this blocking electrode from a reading stage (RL, CL).

6 Claims, 6 Drawing Sheets

PROGRAMMABLE INTEGRATION TIME PHOTOSENSITIVE SENSOR

BACKGROUND OF THE INVENTION

1. Field of the Invention

The invention concerns photosensitive sensors, and especially (but not exclusively) photosensible linear arrays such as those used for line-by-line image analysis (for observation, transmission by fax, image storage, etc.).

2. Description of the Prior Art

An array is normally constituted of a line of M elementary sensors and the image is observed by making this array move perpendicularly to its longest axis. The array moves in front of the image or the image moves in front of the array. The speed of movement is in principle constant.

Each sensor generates an electric charge representing the light intensity (which we shall call "illumination") emitted by the point in front of it. This sensor therefore generates successive electric charges representing the respective illumination of each successive point moving in front of it. Observation of an image consists in collecting the electric signals representing the illuminations of all the image points seen by the array.

SUMMARY OF THE INVENTION

To improve the signal:noise ratio of the photosensitive sensors, a reading principle has already been proposed which observes an image point using not a single elementary sensor but a series of n elementary photosensitive cells which pass one after the other in front of this point. An electric charge proportional to the illumination of the point is generated by the first cell while it is in front of the point; then the second cell passes in front of the point and a second electric charge is generated; these two charges are added together, and the process continues until all n elementary cells have passed in front of the point. But while the second cell is observing the first image point, the first cell is detecting the illumination of a second image point which arrives in front of it; it is of course necessary not to confuse the charge it then generates with the charge it generated during observation of the first point. A time lag system for the charges is thus introduced before they are added, this time lag being synchronized precisely with the relative movement of the sensor and the image to be observed.

These systems are known as time delay integration systems: for each image point, the charge generated by the first cell while it is in front of the point is registered, and then added to that of the second cell when it passes in front of the same image point, and so on until the nth cell; the nth cell gives the integral of the charges generated at n successive instants, these instants all corresponding to the same image point observed by n different cells.

FIG. 1 represents the constitution of such a system: the sensor is an array of M elementary sensors in line. But each sensor in fact comprises n elementary cells positioned in a column in the direction of movement of the array with respect to the image to be analysed. The relative direction of movement is indicated by an arrow 10 in FIG. 1.

The elementary photosensitive cells are symbolised by adjacent elementary rectangles. Under these rectangles are accumulated the charges generated by the illumination of a point which passes in front of the rectangle. Each rectangle corresponds in practice to a surface portion of a photosensitive semiconductor covered with a thin insulating layer, itself covered with at least two adjacent transparent electrodes. These electrodes serve both to establish potential wells in the semiconductor to store the charges generated and, in combination with the electrodes in the adjacent cells, to establish transfer potentials to make these charges pass from one cell to the next (in the column) in accordance with a conventional principle of a charge transfer shift register. The number of electrodes per cell depends on the type of register required.

This structure is a sensor whose cells act both as a photosensitive sensor and as a shift register but the invention could apply to structures in which the functions of photosensitive detection and transfer between lines are separate.

The M sensors in line (perpendicularly to the arrow 10) are physically separated from each other so that there is no confusion between the charges corresponding to two laterally adjacent sensors.

There are therefore in parallel M shift registers in columns each with n compartments.

These M registers can be emptied at the end into the compartments of another shift register RL known as a "reading register" which stretches in the direction of the lines of the array. This register, with M compartments, with inputs in parallel and outputs in series, enables cyclic evacuation towards an output amplifier, by line offset, of the charges from the M columns. An electrode PT acting as a transfer gate enables the registers in columns to be emptied into the reading register, synchronized with the offset of the column registers. The reading register is itself emptied horizontally very quickly between each new arrival of charges from the column registers. A reading circuit CL comprising essentially a charge-voltage converter and an amplifier A is arranged at the output from the register RL and supplies at output a video signal representing line by line the image analysed by the array.

The reading register could be replaced by any other system of reading the charges from the M columns.

It should be noted that the reading register and the transfer gate PT are masked (e.g. by a layer of aluminum) so that they receive no light.

From here on we shall be concerned only with the shift registers with n compartments arranged in a column, as the invention is not related to the presence of the reading register.

As we know, shift registers can be constituted in several different ways and the details of their construction are not important here. These details can be found in the literature on charge transfer shift registers: there are registers known as two-phase registers, in which each compartment has two electrodes connected to each other and the electrodes in two adjacent compartments are controlled in antiphase with respect to each other. There are four-phase registers in which each compartment has four electrodes controlled by four successive phases, the phases being the same for corresponding electrodes of two adjacent compartments. There also exist registers operating in three-phase mode and registers operating in ripple clock mode.

This last mode, ripple clock mode, is taken to be used in the example given in FIG. 1: there are two electrodes in each compartment, but they are electrically connected. Each photosensitive compartment of the register has been represented by a rectangle divided into two by a dotted line. The two electrodes correspond to the two halves of the rectangle. A single external connection controls the potential applied simultaneously to these two electrodes and also applied simultaneously to all the electrodes in the same line. The controle sequence of the sensor's electrodes comprises a series of successive pulses applied to the successive lines of the multilinear array: a first pulse $\phi 1$ is applied to the first line, then a second pulse $\phi 2$ is applied to the second line, etc., until the nth pulse is applied to the nth line, after which a new pulse cycle begins.

The phases $\phi 1$, $\phi 2$, . . ., $\phi n$ are therefore successive pulses which come after each other without overlapping, according to a cycle such that a new pulse for phase $\phi 1$ appears only when the pulses for the n phases have all been emitted successively. FIG. 2 represents a pulse cycle in this mode, for n=8 register compartments.

FIG. 3 shows in its upper part the register with eight compartments in a column, with, for each compartment, two adjacent electrodes electrically connected together; these two electrodes define underneath them potential wells of different depth owing to either different doping of the semiconductor which they cover, or a different thickness of insulating material between the electrode and the semiconductor; underneath this diagrammatic representation, FIG. 3 represents the successive potential wells which are created under these electrodes during the eight successive phases, and the charges which accumulate in these wells. The accumulation is a result of two factors: one is the illumination of the photosensitive compartments of the register, and the other is the discharge of the charges from one well to the next (therefore from one register compartment to the next) under the effect of the pulses applied successively from one electrode to an adjacent electrode.

As can be seen in FIG. 3, phase $\phi 1$ provokes the discharge at the output of the register in column (to the reading register in line) of the charges accumulated under the last electrode in the register. Then phase $\phi 2$ provokes the discharge under this last electrode of the charges accumulated under the next-to-last, and so on, the position of the discharge zone moving from right to left as far as the input of the register, after which the cycle begins again. But during this progressive movement, the photosensitive cells making up the compartments of the register continue to be illuminated and accumulate charges proportional to their illumination. A compartment is thus illuminated by an image point during n pulses, and at the nth pulse, the accumulated charges are discharged into an adjacent compartment which will be situated in front of the same image point during the following cycle.

The observation of a point by an elementary cell lasts for a complete cycle of n phases. In other words, the speed of movement of the image under the cell is such that a point covers the distance between two adjacent compartments of the register during the time required to complete a cycle of n pulses.

In these time delay integration multilinear arrays, it can be noted that the signal:noise ratio is better than that of a simple linear array of M cells. When the signal level is high, the dominant noise is the photon noise, i.e. the noise resulting from the creation of electron-hole pairs under the effect of the illuminations. This noise is quadratic and is multiplied by the square root of n if the amplitude of the signal is multiplied by n. In fact, the signal is on average multiplied by n with respect to what it would be with a single cell instead of n cells adding their signals. At a high level, the signal:noise ratio is therefore multiplied by the square root of n. At a low signal level, the dominant noise is the reading noise, but the system is such that there can always be only one charge reading, while the signal is multiplied by n. There is therefore an improvement in the signal:noise ratio, an improvement in a ratio of up to n.

It has however been noticed that it is difficult to receive illuminations likely to vary very much with such a system. The individual cells must have dimensions such that they can satisfactorily detect an illumination that they receive from an image point, even if the illumination is weak. However, to improve the resolution, the size of the elementary cells is limited as far as possible. But these cells must also be of sufficient size to receive by transfer the sum of the illuminations received by all the cells in the same column. If the illumination is relatively great, the elementary cells risk being saturated: this saturation is reached n times faster than if there was only one cell. The problem becomes more acute as n becomes greater (when a great improvement of the signal:noise ratio is required) and as the size of the elementary cells is reduced (when a high image resolution is required).

SUMMARY OF THE INVENTION

An aim of the invention is to avoid this disadvantage as far as possible and to improve the compromise between resolution, dynamics and signal:noise ratio.

It is proposed to program the number n of lines used in delay and integration of charges, to give it either the value n or a value k smaller than n.

It will notably be ensured that the number of lines can be reduced when the illumination is too great.

In the prior art, means of changing the number of lines active have already been proposed, but the means used are not very convenient.

In FR No. 2417899, a matrix is used which is divided into two sub-matrices supplied by different clock signal conductors for each matirx: the number of lines changes depending on whether the clock signals are applied to one or other of the sub-matrices.

In U.S. Pat. No. 4 280 141 the same technique is used with three sub-matrices.

In EP 0 281 178, additional blocking electrodes are used, placed between the normal electrodes. In addition, there is an obligatory evacuation drain placed laterally. Finally, whatever the number of lines programmed, the charges circulate in the whole of the register and there is no separation of the matrix between two zones without possible transfer between the zones.

According to the invention we simply use the electrodes of the shift register which enable time delay of the generated and stored charges in columns. Instead of controlling these electrodes systematically to perform periodic shifts, some of the electrodes will be controlled in such a way as systematically to prevent certain transfers, in order to limit the additions and carryings of charges to a number k less than n when the illumination is too great. The number k can be made to vary as a function of the illumination. There will therefore be blocking electrodes controlled separately from the others. But these electrodes can be physically the same electrodes which are used for the delay: when they act as blocking electrodes they inhibit the transfers to limit the charge additions to k; when they act as transfer electrodes, they are controlled cyclically in accordance with the delay cycles necessary for the charge transfers.

A possible definition of the invention is as follows: A multilinear photosensitive sensor of n lines operating in time delay integration mode, organized in n lines of M columns of elementary photosensitive cells, with programming of the number k of lines actually used for charge transfer and integration, the sensor including electrodes enabling the transfer of stored charges from one line to the following adjacent line and the transfer of the charges from the last line of cells to a reading stage, with clock signals common to all the lines to provoke these transfers, characterised by the fact that means are also provided to apply to certain electrodes known as "blocking electrodes" either the clock signals enabling the transfer or a blocking potential preventing any transfer at this electrode while the other electrodes situated between this electrode and the reading stage continue to receive potentials enabling transfers.

One or several electrodes can then be provided which are thus able to be controlled in two different modes, the position of the electrode which is actually used as a blocking electrode determines the number k (less than n) of lines between which the additions and transfers of charges are performed: the electrodes situated on the other side of the blocking electrode selected do not participate in the charge transfers.

The blocking is made operational from the moment when the average illumination exceeds a given threshold; the position of the blocking electrode selected (if there are several possible electrodes) then varies as a function of the level of illumination. This illumination can be measured at output from the reading stage, in practice at the output from the amplifier which provides the signal representing the image, but other measurement systems can also be imagined, for example with a specific sensor measuring the average illumination of the image or of the portion of the image analysed by the sensor.

It is preferably arranged that the lines of cells situated on the other side of the blocking electrode selected can evacuate the charges they accumulate towards an evacuation drain. This drain is preferentially situated on the other side of the lines of cells from the reading stage.

It will be noted that the fact that the electrodes used for blocking are in any case necessary for transfer between lines makes it possible not to change the step of the register from one end to the other, i.e. both where there are blocking electrodes and where there are none. As a result, the invention makes it possible not only not to change the step between lines (with respect to the step of a register with no programming of the number of lines) but also to keep this step constant over the whole length, which is particularly important when the cells of the register are photosensitive.

BRIEF DESCRIPTION OF THE DRAWINGS

Other characteristics and advantages of the invention will appear on reading the following detailed description which refers to the appended drawings, in which.

DESCRIPTION OF THE PREFERRED EMBODIMENT

In the following description, we shall not repeat the detailed description of the operation of the time delay integration multilinear arrays: the description already given remains valid for the use of the invention with the modifications which will now be explained.

Figure 4:
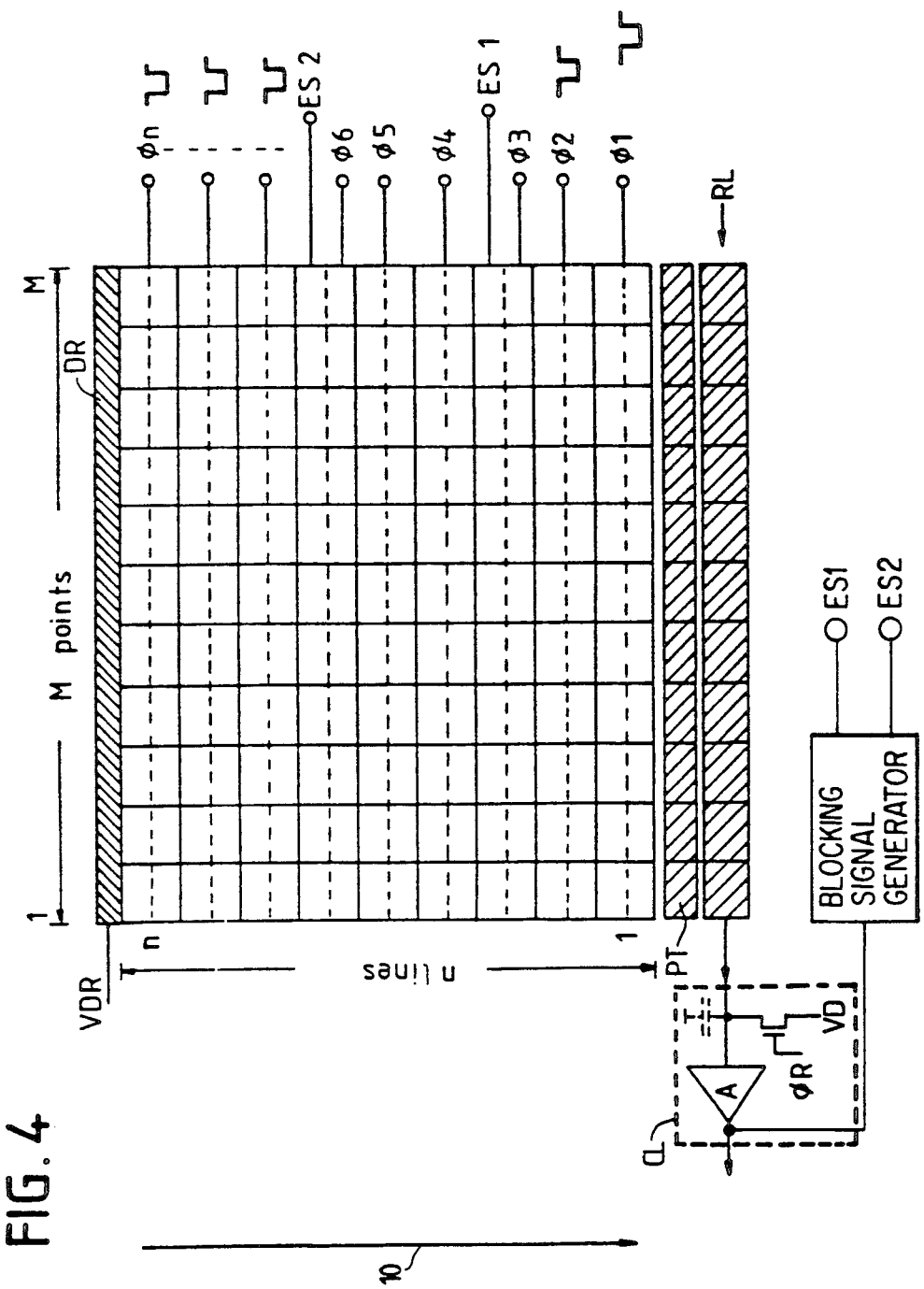
FIG. 4 gives a simplified representation of a multilinear array modified in accordance with the present invention.

FIG. 4 is a simplified representation of a mode of embodiment of the array according to the invention.

The principle is that means are provided to restrict the number of lines in the multilinear array at will to a value k less than n, to perform carrying of charges only over k lines when the illumination is too high, and over n lines when the illumination is relatively low.

To do so, taking the simples example of registers operating in two-phase mode or in ripple clock mode, some of the electrodes are used in line by disconnecting them from the neighbouring electrode to which they are normally connected in these registers.

In other words, if a line of a register has two electrodes which are normally connected together to receive the same potential varying in accordance with a cycle which enables charge transfers to be made, the invention proposes that certain of the lines in the register (or even all of them, if required) have their two electrodes disconnected in such a way that they can be controlled separately.

If the illumination is such that there is no risk of saturating the compartments of the register in column or the compartments of the reading register, the disconnected electrodes will be "reconnected", i.e. two adjacent disconnected electrodes will be controlled by the same potential so as to perform the charge transfers exactly as in the multilinear arrays of the prior art.

If, on the other hand, the illumination is too intense, one of the two electrodes of a line in which the electrodes are disconnected will have a potential applied to it to prevent any transfer of charges regarding this line. The charge integration and time delay will then be restricted to the k lines situated between this blocking line and the reading register. Depending on the position of the blocking electrode activated, k will be greater or less. If there exist several lines whose electrodes can thus act as blocking electrodes, k will be able to vary. A choice will then be made for the value of k, and thus for the position of the line to be activated in blocking mode, as a function of the level of illumination, k being smaller as the illumination is greater.

FIG. 4 gives an example of an embodiment in which there are two possible blocking electrodes, ES1 and ES2, the first enabling the multilinear array to be restricted to three lines, and the second to six lines.

When a blocking electrode is thus activated in blocking mode, the lines of the register situated between this electrode and the reading register are activated in charge transfer mode enabling charge integration and time delay operation. But the other electrodes, situated beyond the blocking electrode, can either continue or cease to receive conventional charge transfer potentials; in any case, if they continue to be activated to perform transfers, these transfers are useless and do not affect the charges transmitted to the reading register.

It is preferentially provided that a charge evacuation drain DR is situated along the line of cells farthest from the reading register, so that the charges generated in the lines situated beyond the blocking electrode are eliminated and there is no risk that they may pass under the blocking electrode by accumulating. It is of course arranged that the blocking potential applied to the blocking electrode when it has to separate the sensor in an active zone and an inactive zone is low enough to form a potential barrier which will permit no transfer between the two zones. It is in particular lower than the potentials applied to the different electrodes in the conventional transfer mode.

Figure 1:
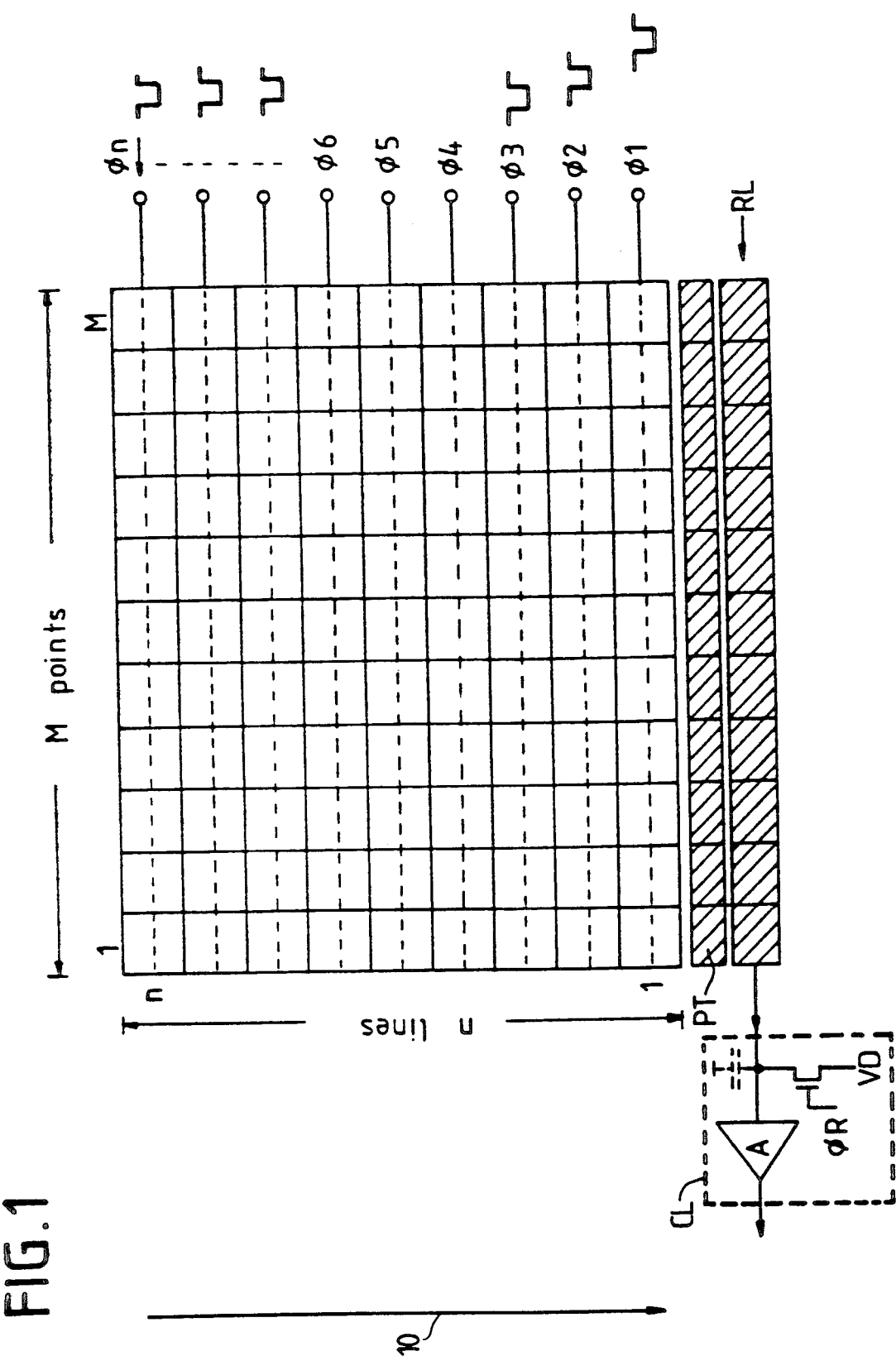
FIG. 1, already described, represents a photosensible multilinear array with time delay integration.
Figure 2:
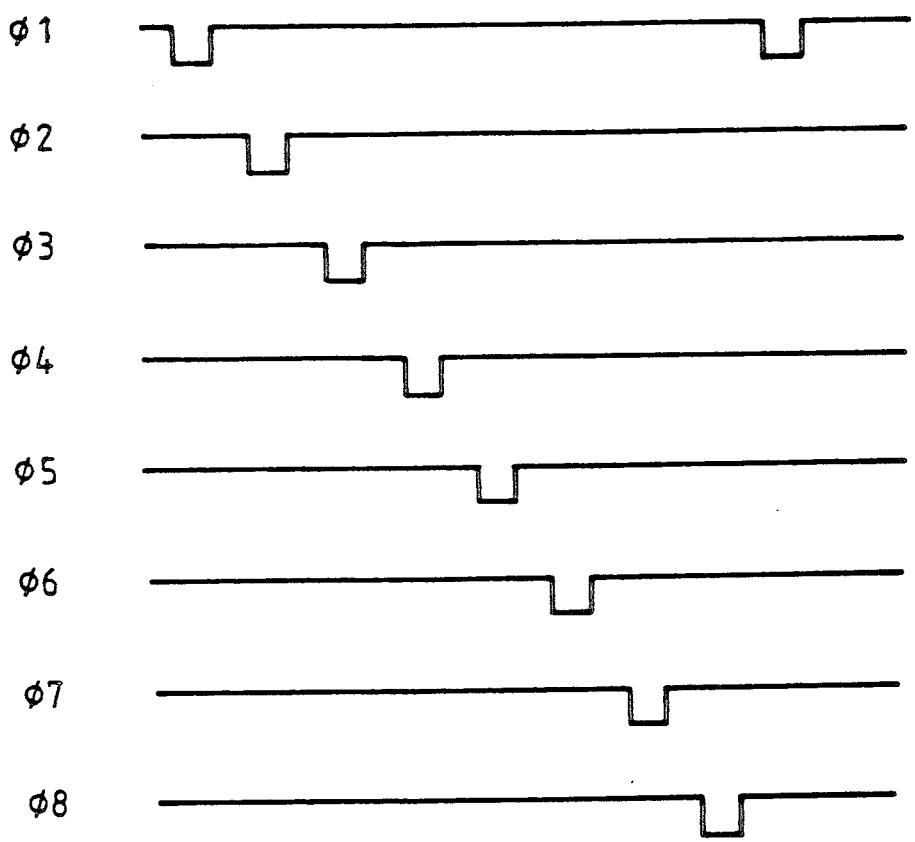
FIG. 2 represents a time diagram of the control phases of the registers in column of the array shown in FIG. 1, in ripple clock mode with eight phases.
Figure 3:
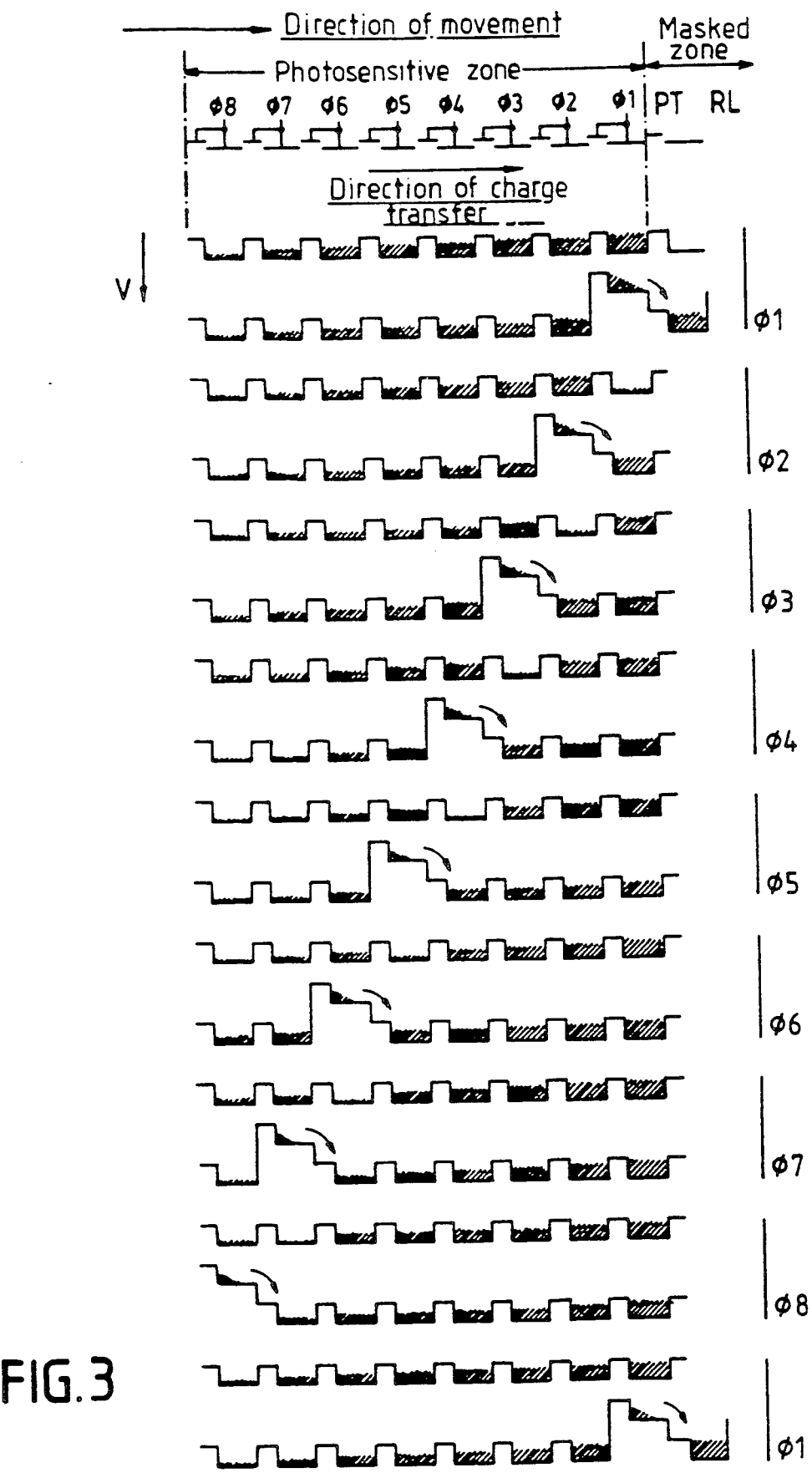
FIG. 3 is a diagram representing the potential wells and charge accumulations which form during the different phases of operation of the sensor in FIG. 1.
Figure 5:
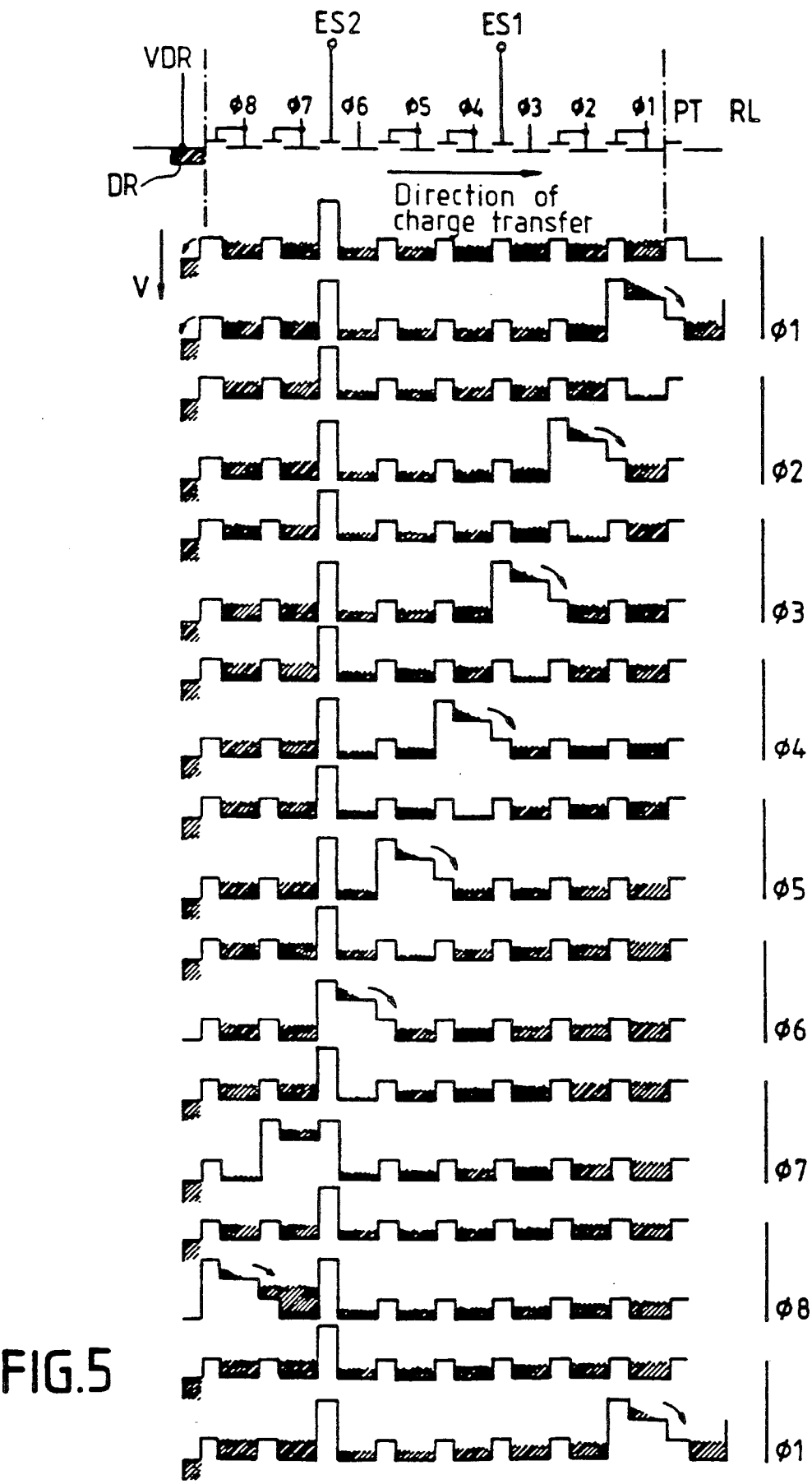
FIG. 5 represents a diagram corresponding to that in FIG. 3, modified by the use of the invention.

FIG. 5 represents, in the same way as FIG. 3, both the physical arrangement of the electrodes of a register in column, with a drain DR at one end of the register, and the potentials created in the semiconductor under the different electrodes during the different phases of operation of the array. In the example shown, it has been assumed that the electrode ES2 is activated for blocking and creates a high potential barrier separating the sensor into two zones, an inactive zone on the right and an active zone on the left.

In the active zone, the accumulation of charges under the effect of the illumination and the transfers between cells occurs as usual but is restricted to $k=6$ lines of cells.

In the inactive zone, cell saturation occurs rapidly, after a few cycles of n phases, but the evacuation drain DR prevents excessive accumulation which could lead to overflow through the blocking electrode.

If the illumination decreases, for example during observation of another image, or for a darker part of the same image, the electrode ES2 ceases to be controlled by a low blocking potential and is reconnected to the adjacent electrode corresponding to the same line of cells, to be again controlled by the conventional delay pulses of the ripple clock mode.

Figure 6A:
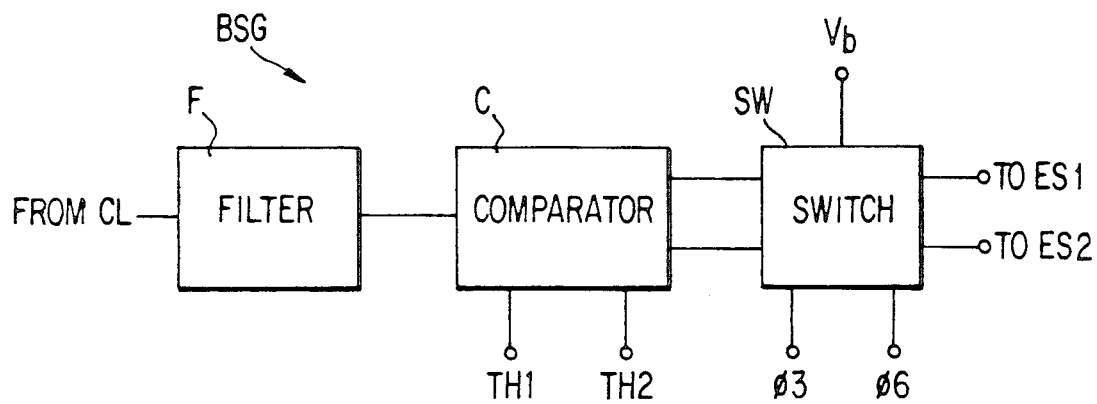
FIGS. 6A and 6B are schematic block diagrams of the block signal generator shown in FIG. 4.

As shown in FIG. 4, a blocking signal generator BSG is provided to determine whether a blocking electrode should be activated in blocking mode and to determine which of the blocking electrodes should be used. In one embodiment of the BSG, shown in FIG. 6A, the average illumination of the image or of the part of the image observed is measured. The average illumination can be measured by means of a filter F filtering the output of the reading circuit CL, with a time constant enabling quick reaction (at most the time of analysis of a few lines) as soon as the illumination level risks causing saturation.

The average illumination detected by comparator C can be compared with thresholds TH1 and TH2 each corresponding to the use of a specific blocking electrode output of comparator C, switch SW outputs the blocking level Vb to one or the other of electrodes ES1 or ES2, or the clock signals $\phi 3$, and $\phi 6$, respectively, to electrodes ES1 and ES2.

Figure 6B:
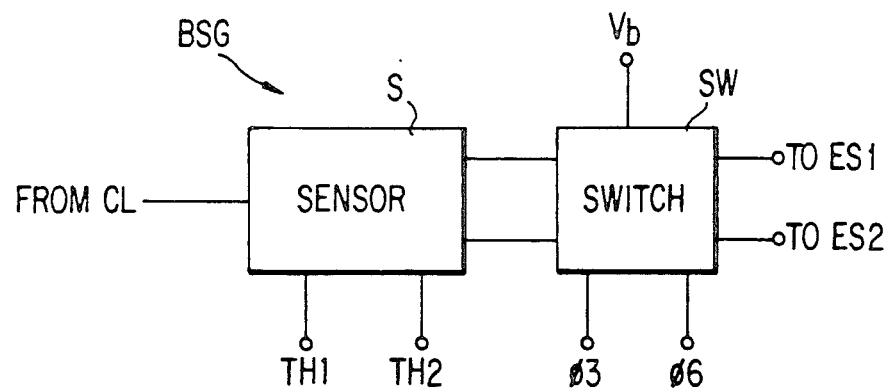

As shown in FIG. 6B, the illumination can also be measured by a separate sensors which measures the average overall illumination of the whole of the image or of the whole of the part of the image being analysed. The outputs of the sensor S are applied to switch SW which applies the appropriate signals to the electrodes ES1 and ES2.

The invention is of course applicable to multilinear sensors in which the cells are constituted in such a way as to perform in other delay modes than the ripple clock mode.

When the electrodes are constituted to make a register of two-phase type, each line of cells comprises two adjacent electrodes receiving the same potential (as for the ripple clock mode). The potentials applied to the electrodes have two complementary phases $\phi 1$ and $\phi 2$ (and not n phases) and the electrodes in a line receive a potential in antiphase with the potential applied to the electrodes in the adjacent lines. According to the invention, a blocking electrode will be constituted by separating the two electrodes of a line electrically and applying to one of them a blocking potential, while the other electrodes continue to receive transfer potentials according to the two phases $\phi 1$ and $\phi 2$.

In another example, when the electrodes are arranged in such a way as to make a four-phase type shift register, each cell has four electrodes supplied by four successive phases $\phi 1$ to $\phi 4$; the electrodes of the following cell receive the same phases $\phi 1$ to $\phi 4$. A blocking electrode is constituted of one of these electrodes thanks to a logic circuit enabling a blocking potential or the normal phase to be applied at will to the electrode.

The invention can be applied to other types of registers, and notably to three-phase registers and ripple clock registers in which the number of phases of the cycle is not equal to the number n of lines of the sensor (for example there can be sixteen lines arranged in two groups of eight lines each operating in a cycle of eight phases).

What is claimed is:

1. Multilinear photosensitive sensor of n lines operating in charge integration and time delay mode, organized in n lines of M columns of elementary photosensitive cells, with programming of the number k of lines actually used in charge integration and transfer, the sensor including electrodes which enable stored charges to be transferred from one line to the next adjacent line and the charges in the last line of cells to be transferred to a reading stage, with clock signals common to all the lines to provoke these transfers, characterized by the fact that means are also provided to apply to certain electrodes known as "blocking electrodes" either the clock signals enabling the transfer to be made, or a blocking potential preventing any transfer at this electrode while the other electrodes situated between this electrode and the reading stage continue to receive potentials for transfers.

2. Sensor according to claim 1, characterized by the fact that it comprises several blocking electrodes at given line positions in the sensor, and means of making one of these electrodes, selected in accordance with the illumination, function in blocking mode.

3. Sensor according to any one of the previous claims, wherein the step of the lines of the register is constant for all the lines, the blocking electrodes being electrodes which would in any case be used for the transfer if there was no possibility of programming the number of lines.

4. Sensor according to claims 1 or 2, wherein the reading stage being situated to one side of the sensor, a charge evacuation drain is provided on the other side to avoid the overflow of charges through the blocking electrode.

5. Sensor according to claims 1 or 2, wherein the programming of the number (k) of lines used in charge integration and time delay is a function of the illumination of the image analysed, measured by filtering at the output of a stage of reading of the charges generated by the sensor.

6. Sensor according to claims 1 or 2, wherein the programming of the number (k) of lines used in charge integration and time delay is a function of the illumination of the image analysed or of the part of the image analysed, measured by a specific sensor.

* * * * *